(No Model.)
J. H. DICKINSON.
LOGGING APPARATUS.
No. 579,140. Patented Mar. 23, 1897.
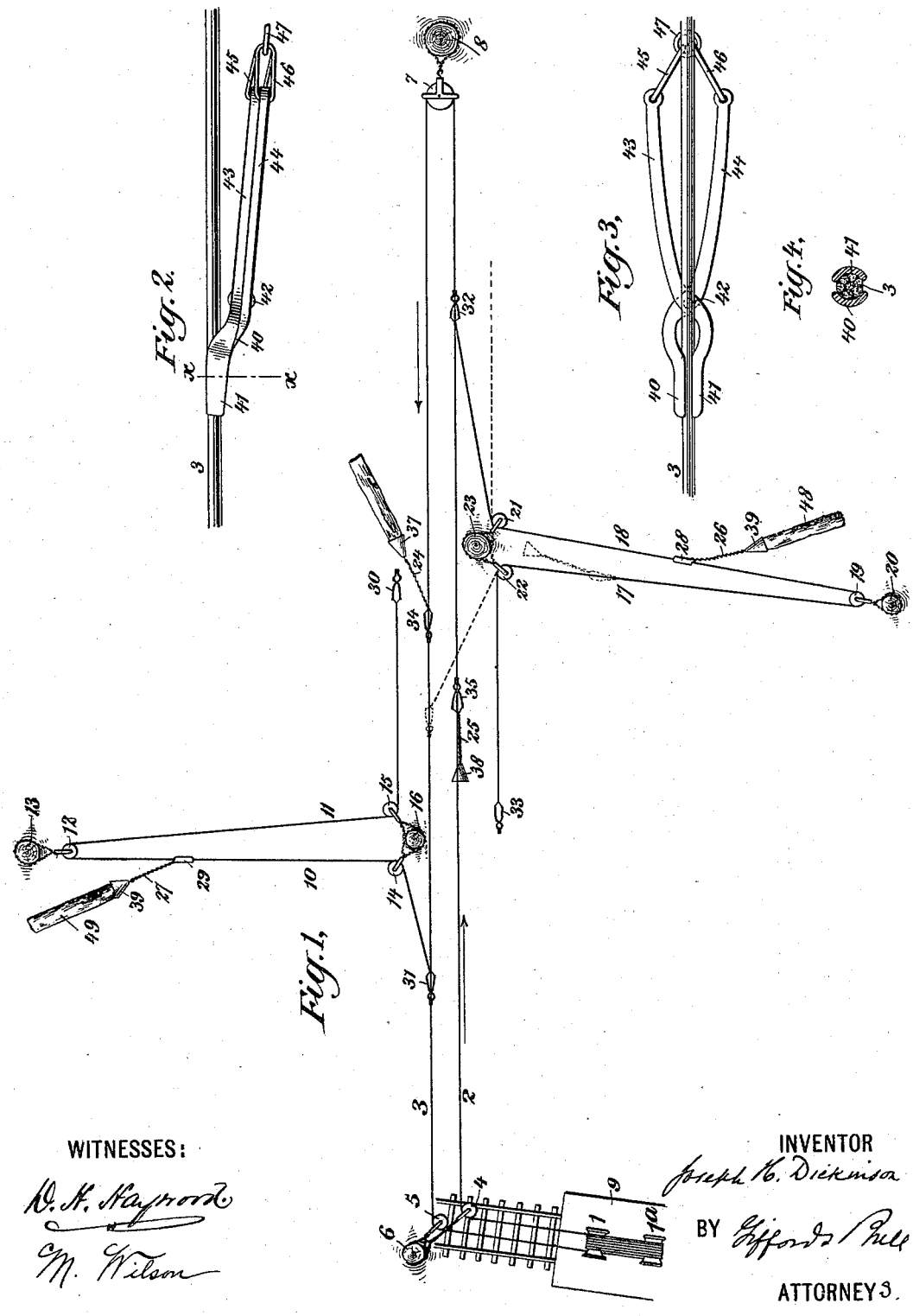
WITNESSES:
INVENTOR
ATTORNEYS.

UNITED STATES PATENT OFFICE.

JOSEPH H. DICKINSON, OF BROOKLYN, NEW YORK.

LOGGING APPARATUS.

SPECIFICATION forming part of Letters Patent No. 579,140, dated March 23, 1897.

Application filed October 25, 1895. Serial No. 566,848. (No model.)

*To all whom it may concern:*

Be it known that I, JOSEPH H. DICKINSON, a citizen of the United States, and a resident of Brooklyn, in the county of Kings and State of New York, have invented certain new and useful Improvements in Logging Apparatus, of which the following is a specification.

In the drawings, Figure 1 is a plan view of the system. Figs. 2 and 3 are details of the means of attachment that may be used between the side-line ropes and the main-line rope. Fig. 4 is a cross-section on line $x\ x$ of Fig. 2.

1 $1^a$ are drums around which passes the endless rope 2 3, which constitutes the main-line rope between the sheaves 4 5 at the head-support 6 and the sheave 7 at the tail-support 8. The drums will be driven by any suitable engine mounted upon the railway-car or other vehicle 9.

10 11 is a side-line rope extending around the sheave 12 on the side-line tail-support 13 and through the sheaves 14 and 15 on the side-line head-support 16.

17 18 is a similar side-line rope on the opposite side of the main-line rope and extending around the sheave 19, fast to the side-line tail-support 20, and around the sheaves 21 and 22, fast to the side-line head-support 23.

24 and 25 are main-line branch ropes.

26 and 27 are side-line branch ropes connected with the side-line ropes by the couplings 28 and 29.

30 and 31 are couplings on each end of the side-line rope 10 11, adapted to be connected with the main-line rope 2 3, and 32 and 33 are similar couplings on the ends of the side-line rope 17 18. Similar couplings 34 and 35 may be employed for securing the main-line branch ropes to the main-line rope.

36, 37, 38, and 39 are cones connected with the branch ropes.

The couplings may be made as shown in Figs. 2 and 3, consisting of tongs provided with the jaws 40 41, adapted to grip the main-line rope 2 or 3 and pivoted together at 42, and provided with the arms 43 44, with links 45 and 46 connecting the extremities of the arms with the rings 47, connected with the end of the side-line rope or the branch rope, as the case may be. Such couplings act substantially as tongs to grip the main-line rope at any point desired.

The operation is as follows: The main-line rope is driven by the drum $1^a$ continuously in the same direction, as indicated by the arrows. The full lines in the drawings represent the two side-line ropes as hauling the logs 48 and 49 toward the main-line rope. The power applied for doing so is communicated to them from the main-line rope through the couplings 31 and 32. When this operation has proceeded far enough to bring the logs 48 and 49 up to the main-line rope, they will be disconnected from the branch ropes 26 and 27 and connected with the branch ropes secured to the main line, as, for example, the log 48 will be connected with the branch rope 24 and will be by it hauled up near the main-line head-support 6, ready to be loaded onto the vehicle.

The branch lines and their cones may be hauled back to their starting-points as follows: The main-line branch rope is disconnected from the ingoing part 3 of the main-line rope and connected to the outgoing part of the main-line rope, as shown at 35. The end of the side-line rope, as 32, before connected with the main-line rope is disconnected therefrom, and the opposite end of the side-line rope, as 33, is connected with the other branch of the main-line rope. The side-line branch rope is also disconnected from the ingoing part of the side-line rope and connected with the outgoing part thereof. Such an arrangement of the connections for the purpose of hauling the branch lines and their cones back to their starting-points is shown in dotted lines in Fig 1.

By the use of the apparatus above described logs will be continuously received from the side lines at the main line and will be continuously delivered by the main line at the point of delivery, while, if required, the power of the main line may also be employed for returning the cones and branch lines to the starting-points and the side lines to starting position.

By this apparatus logs may be brought from much greater distances on either side of the main line than has been possible heretofore. Thus the capacity of a main line is multiplied both as to scope of territory within its reach and the handling of the logs as to numbers and speed, coupled with a reduction of labor.

I am aware of Patent No. 400,728 to Baptist, dated April 2, 1889, and Patent No. 523,577 to Ivens, dated July 24, 1894, and make no claim to that which is therein described.

I claim—

1. In a logging apparatus, in combination with a main-line rope and a side-line rope, the following parts whereby the side-line rope is controlled, viz: a side-line tail-support, a sheave connected therewith and a means of attachment with the main-line rope, substantially as described.

2. In a logging apparatus, in combination with a main-line rope and a side-line rope, the following parts whereby the side-line rope is controlled, viz: a side-line tail-support, a sheave connected therewith and means of attachment with the main-line rope at each end of the side-line rope whereby said side-line rope may be hauled in either direction by the main-line rope, substantially as described.

3. In a logging apparatus, in combination with a main-line rope and a side-line rope, the following parts whereby the side-line rope is controlled, viz: a side-line tail-support, a side-line head-support, sheaves connected with said supports, a connection with the main-line rope at each end of the side-line rope and a side-line branch rope connected with the side-line rope, substantially as described.

4. In a logging apparatus, in combination with the main-line rope and two side-line ropes on opposite sides of said main line, the following parts for operating each of said side-line ropes, viz: a side-line head-support, a side-line tail-support, sheaves connected with said supports, an attachment with the main-line rope at the end of the said side-line rope, substantially as described.

JOSEPH H. DICKINSON.

Witnesses:
M. WILSON,
C. J. RATHJEN.